United States Patent
Kuroiwa et al.

[11] Patent Number: 6,166,721
[45] Date of Patent: Dec. 26, 2000

[54] MOUSE AS COMPUTER INPUT DEVICE HAVING ADDITIONAL MECHANISM FOR CONTROLLING ADDITIONAL FUNCTION SUCH AS SCROLLING

[75] Inventors: Kouichi Kuroiwa, Tochigi; Katsuyoshi Nakajima, Ashikaga; Hiroshi Fujikake, Tochigi, all of Japan

[73] Assignee: Mitsumi Electric Co., Ltd., Tokyo, Japan

[21] Appl. No.: 09/122,521

[22] Filed: Jul. 24, 1998

[30] Foreign Application Priority Data

| Jul. 25, 1997 | [JP] | Japan | 9-200214 |
| Jul. 25, 1997 | [JP] | Japan | 9-200300 |
| Jul. 25, 1997 | [JP] | Japan | 9-200386 |

[51] Int. Cl.⁷ ..................................................... G09G 5/08
[52] U.S. Cl. .......................................... 345/163; 345/123
[58] Field of Search ................... 345/156, 157, 345/163, 164, 165, 166, 167, 168, 169, 123, 124, 125, 341

[56] References Cited

U.S. PATENT DOCUMENTS 5,530,455  6/1996  Gillick et al. ............................ 345/163
5,912,661  6/1999  Siddiqui ................................... 345/157

*Primary Examiner*—Xiao Wu
*Attorney, Agent, or Firm*—Frishauf, Holtz, Goodman, Langer & Chick, P.C.

[57] ABSTRACT

In a mouse having two click switches with buttons, a motion detector and an additional control switch mechanism for a function of scrolling are provided. The additional control switch mechanism includes a first, a second, and a third switch for producing an up-scroll signal, a down-scroll signal, and a scroll mode selection signal, respectively when being actuated. A single actuator rod having a top push button is disposed to be able to incline opposite directions to selectively actuate the first and second switches and to be pushed down to actuate the third switch. The top push button is disposed between the click switch buttons. Alternatively, the third switch with a push button thereof is disposed at a sidewall of the mouse. In another arrangement, the third switch and the push button thereof are disposed between the two click switch mechanisms, and the first switch a push button thereof and the second switch with a push button thereof are disposed in a sidewall of the mouse.

20 Claims, 12 Drawing Sheets

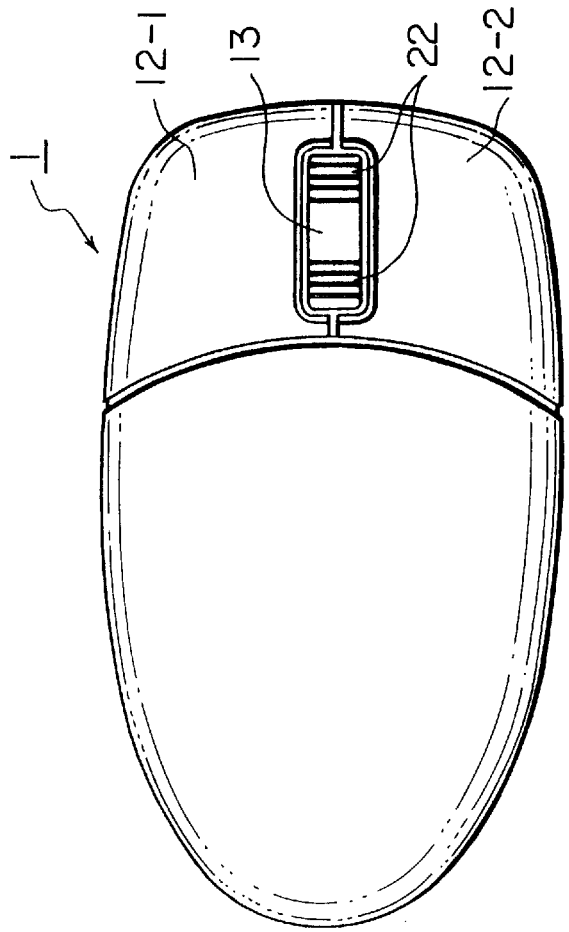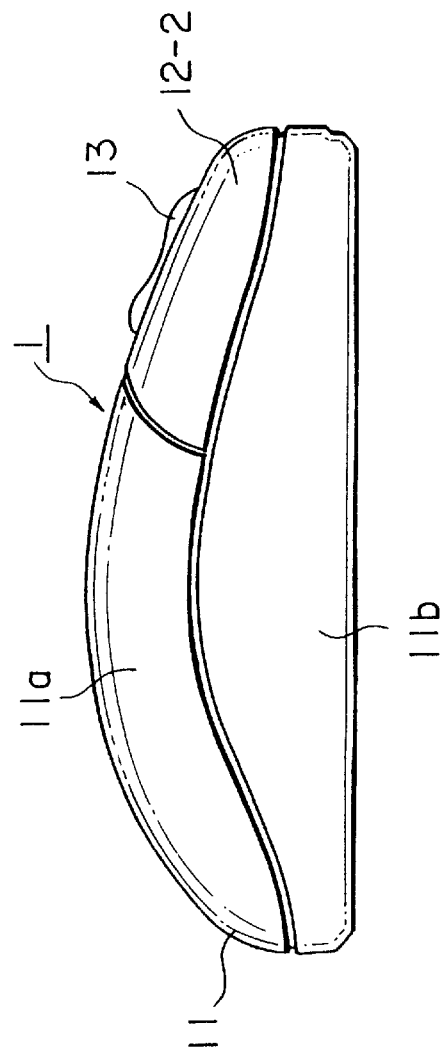
FIG. 1
FIG. 2

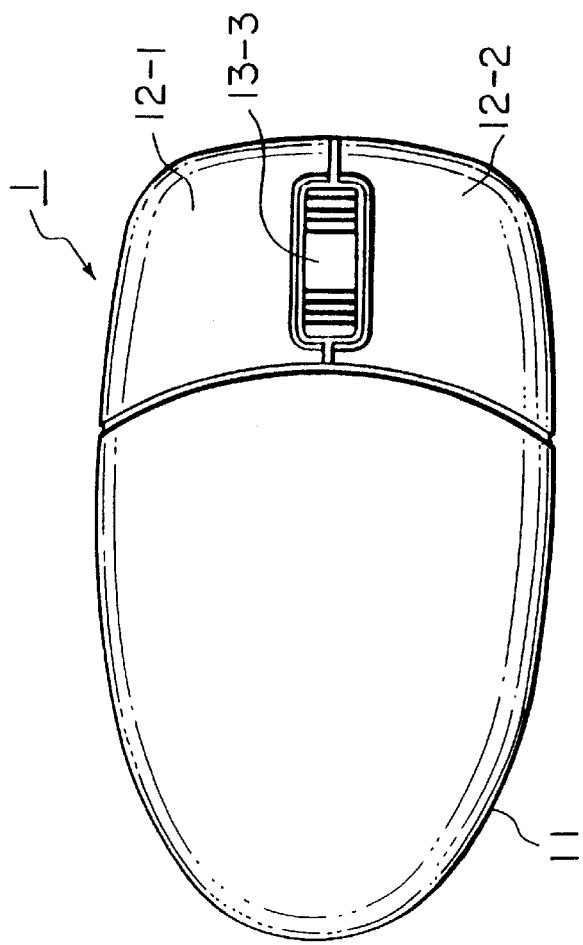
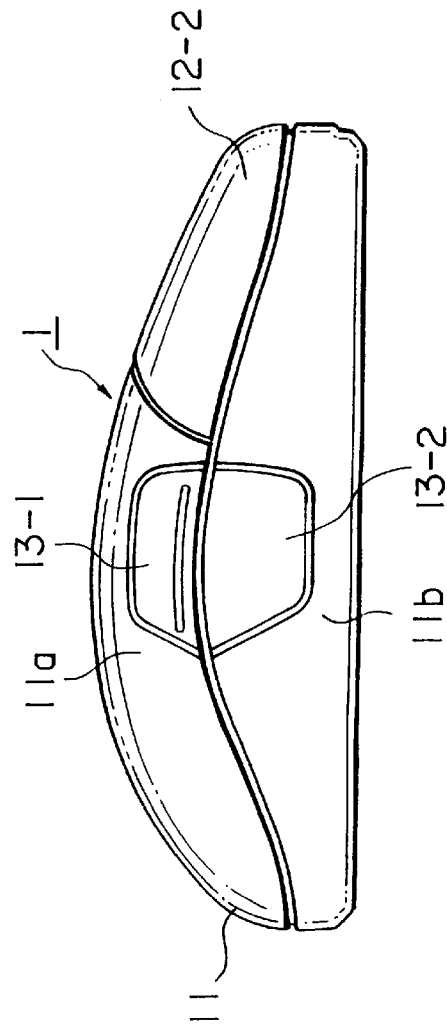
FIG. 14
FIG. 15

MOUSE AS COMPUTER INPUT DEVICE HAVING ADDITIONAL MECHANISM FOR CONTROLLING ADDITIONAL FUNCTION SUCH AS SCROLLING

BACKGROUND OF THE INVENTION

This invention relates to a mouse as an input device of a computer with a monitor having a windows application, and in particular, to such a mouse having an additional manually-operating mechanism for inputting additional instruction or control signals such as, for example, scroll control signals.

In a computer with a monitor a windows application, there are displayed on a screen of a monitor identification marks which are referred to as icons for identifying programs, documents and other applications. A cursor or pointer is also displayed for selectively pointing to one of the icons to open a desired one of the programs or documents. A mouse is used for controlling movement of the cursor on the screen to point to one of the icons for indication or actuation of opening of the program or document identified by the icon that is pointed at by the cursor.

Therefore, the mouse includes a motion detector for detecting a two-dimensional motion of the mouse itself to produce a positional signal which is used for controlling movement of the cursor on the screen so that the cursor moves on the screen according to the motion of the mouse. As the motion detector, there are known various types in the art. In a typical one, a trackball is mounted in the mouse to be freely rotated and therefore rotates according to motion of the mouse on a plane. A converting mechanism including photo-electric encoders is also mounted in the mouse to be coupled with the trackball and convert the rotation of the trackball into X and Y quadrature signals as a position signal.

Further, the mouse has at least one, usually two, click switch mechanisms for indication or actuation of the icon pointed by the cursor. Each of the click switch mechanism comprises a micro switch mounted in the mouse and a click button for manually operating the micro switch from the outside of the mouse. Therefore, the click buttons are exposed outside of a housing of the mouse.

On the other hand, there are messages in bit-mapped memory which are partially displayed at one time in a window area opened on the monitor and scrolled continuously so that the messages are displayed one part after another part. The scrolling operation is usually performed by handling a mouse to point and indicate an icon representing the scroll by moving the mouse and manipulating the click button.

Recently, there has been proposed in, for example, U.S. Pat. No. 5,530,455 and actually used a scroll control system in which the scroll can be controlled directly from a mouse. Therefore, the mouse additionally has a scroll control mechanism for controlling the scroll operation directly from the mouse. In detail, the scroll control mechanism comprises an additional switch for selecting a scroll mode and a control wheel for controlling selection of up-scroll and down-scroll and a scrolling speed and/or distance. The control wheel is rotatably mounted in a housing of the mouse and partially exposed outside the housing to be capable of being manually operated or rotated. The control wheel is coupled to a photo-electric encoder for producing a scroll signal which comprises a speed and/or distance signal representing a rotation speed of the control wheel and a direction signal representing a rotational direction of the control wheel. As known in the art, the photo-electric encoder comprises a photo-coupler and a rotary disk with a plurality of small holes. The rotary disk is rotated together with the control wheel.

The control wheel is also elastically supported in the housing to be pushed down to actuate the scroll mode selection switch.

In operation of the scroll system using the mouse, when the control wheel is rotated without pushing down the control wheel, the messages displayed on the monitor are scrolled by rotating the control wheel. The up-scroll and down-scroll are determined by rotational direction of the control wheel and the scrolling speed is determined by rotational speed of the control wheel.

On the other hand, after selecting the scroll mode by pushing down the control wheel to actuate the scroll mode selection switch, the messages displayed on the monitor can be scrolled continuously once rotating the control wheel. The scroll direction and speed are dependent on the rotational direction and angle of the control wheel. When the control wheel is again pushed down to actuate the scroll mode selection switch, the scroll mode is cancelled.

In the scroll mode, the motion detector is also used for providing the scroll control signal. When the mouse is moved at a distance in a direction after selecting the scroll mode, the distance and the direction detected by the motion detector provide the scroll direction and speed.

In the mouse with the control wheel used in the scroll system, it is troublesome for users to manually rotate the control wheel for controlling the scroll.

Further, the mouse is complicated by provision of the photo-electric encoder in addition to the position detector.

SUMMARY OF THE INVENTION

Therefore, it is a specific object of this invention to provide a mouse having a scroll control mechanism which is simple in structure and in operation by users.

It is a general object of this invention to provide a mouse having an additional function control mechanism which is simple in structure and in operation by users.

This invention is applicable to a mouse for use in input to a computer having a monitor, the monitor displaying a cursor, icons, and messages, which comprises a housing having an inner bottom surface, a positional movement detecting mechanism mounted in the housing for detecting movement of the mouse to produce a position signal, at least one click switch mechanism mounted in the housing and having a click switch button exposed outside of the housing for producing a click signal when the click switch button is operated, and an additional function control mechanism for inputting additional instructions for controlling a function of the computer. According to this invention, the additional function control mechanism comprises:

a first switch element mounted in the housing for producing a first switch signal upon being actuated;

a second switch element mounted in the housing for producing a second switch signal upon being actuated;

a third switch element mounted in the housing for producing a third switch signal upon being actuated;

at least one operating button exposed outside of the housing to be manually operated to actuate the first, the second and the third switches independently from each other from outside of the housing.

According to an embodiment, the first and the second switch elements are disposed to face each other with an interspace therebetween, while the third switch is positioned adjacent to the first and the second switch elements away from the interspace. A switch operating lever is disposed in the interspace and elastically supported on the housing to be thereby possible to be inclined and moved down from a normal standing position. The switch operating lever has a first operating portion to be brought into contact with the first switch element to actuate the first switch element when the switch operating lever is inclined towards the first switch element, a second operating portion to be brought into contact with the second switch element to actuate the second switch element when the switch operating lever is inclined towards the second switch element, and a third operating portion to be brought into contact with the third switch element to actuate the third switch element when the switch operating lever is pushed down. In this embodiment, the operating button is a single and common button which is mounted on a top end of the switch operating lever and having a top surface exposed outside of the housing for manually operating the inclination and downward movement of the switch operating lever.

According to another embodiment, the first and the second switch elements are disposed to face each other with an interspace therebetween. The third switch is positioned adjacent to a side wall of the housing. A switch operating lever is disposed in the interspace and supported on the housing to be possible to be inclined from a normal standing position. The switch operating lever has a first operating portion to be brought into contact with the first switch element to actuate the first switch element when the switch operating lever is inclined towards the first switch element, and a second operating portion to be brought into contact with the second switch element to actuate the second switch element when the switch operating lever is inclined towards the second switch element. In this embodiment, the operating button comprises a first button which is mounted on a top end of the switch operating lever and having a top surface exposed outside of the housing for manually operating the inclination of the switch operating lever from the outside of the housing, and a second button mounted on the side wall of the housing to be movable inward to thereby push and actuate the third switch.

According to a further embodiment, the housing is generally in an egg shape in a plan view, and two click switch buttons are disposed in a top face at an end portion having a relatively large curvature of the egg shape and in parallel with a longitudinal direction of the egg shape. The first and the second switch elements are disposed adjacent to an inner surface of a side wall of the housing, and the third switch element is disposed between the two click mechanism. In this embodiment, the operating button comprises a first button and a second button mounted in the side walls to be pushed inwardly to actuate the first and the second switch elements, respectively, and a third button disposed in the top face between the two click switch buttons to be pushed inwardly for actuating the third switch element.

BRIEF DESCRIPTION OF THE DRAWINGS

FIG. 1 is a plan view of a mouse according to an embodiment of this invention;

FIG. 2 is a side view of the mouse of FIG. 1;

FIG. 14 is a plan view of a mouse according to another embodiment of this invention;

FIG. 15 is a side view of the mouse of FIG. 14;

DESCRIPTION OF PREFERRED EMBODIMENTS

Figure 3:
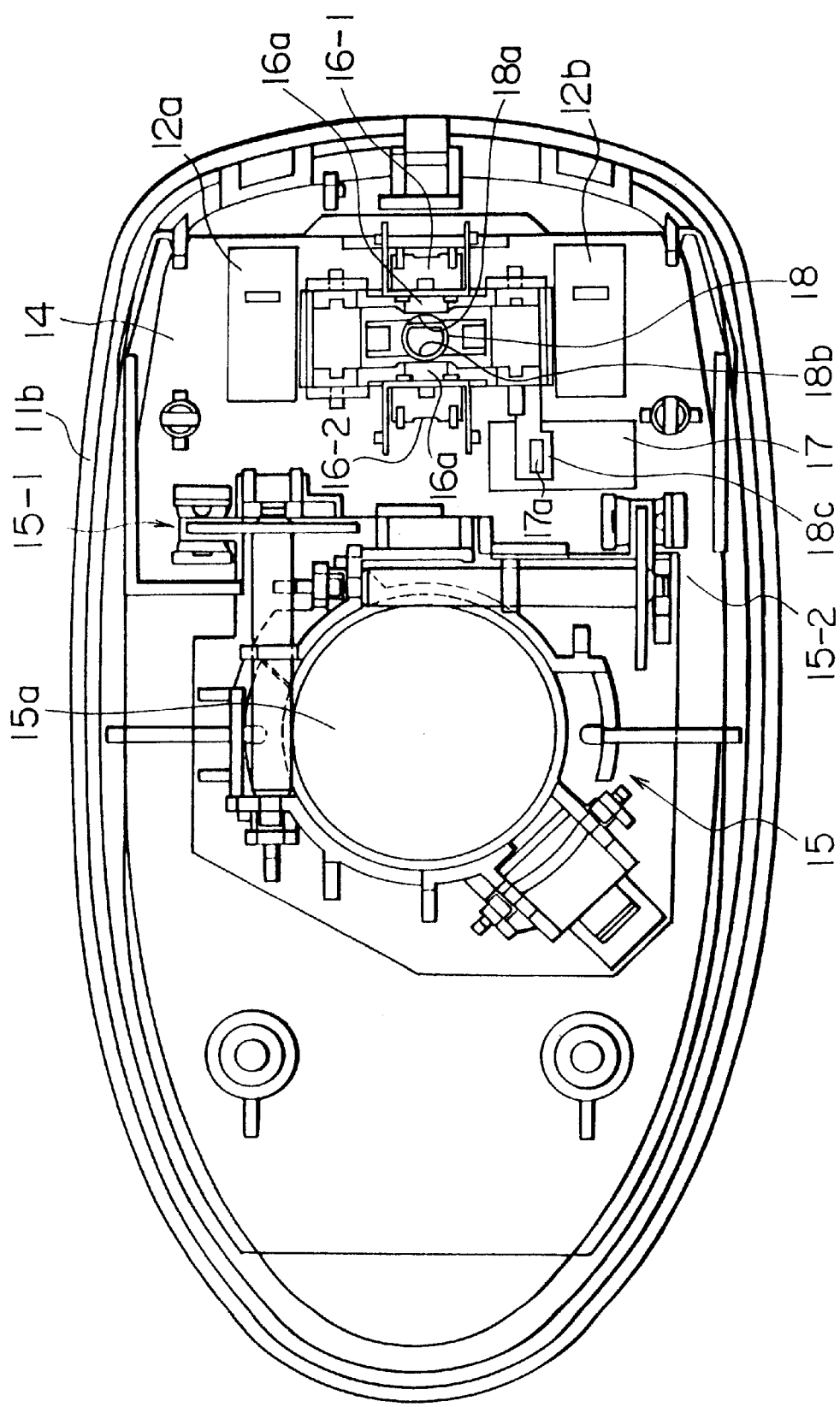
FIG. 3 is a plan view of the mouse of FIG. 1 with an upper case being removed.

Now, a mouse according to an embodiment of this invention will be described with reference to FIGS. 1–5, below.

Referring to FIGS. 1 and 2, the mouse 1 comprises a housing 11 in combination with an upper case 11a and a lower case 11b, first and second click switch buttons 12-1 and 12-2 exposed in the outer surface of the upper case 11a, and an additional switch button or a manual operating button 13 also exposed in the outer surface of the upper case 11a.

The housing is formed in an egg shape in the plan view. The first and second click switch buttons 11-1 and 11-2 are disposed in the top face of the housing 11 at the larger curvature end portion of the egg shape and in parallel with each other in the longitudinal direction of the egg shape. The additional switch button 13 is disposed in an interspace between the both click switch buttons 11-1 and 11-2.

Referring to FIG. 3, there is fixedly mounted a printed circuit board 14 in the lower case 11b. First and second click switches 12a and 12b are mounted on a surface of the printed circuit board 14 and are disposed under the first and second click switch buttons 12-1 and 12-2, respectively, so that they are actuated by the first and second click switch buttons 12-1 and 12-2 pushed down to produce first and second click signals, respectively.

In the housing 11, there is further mounted a motion detector of a known trackball type for detecting movement of the mouse 1 itself. The motion detector 15 comprises a ball 15a mounted to rotate in any rotational direction in the housing 11 and is partially projected out of an bottom surface of the lower case 11b. Accordingly, the ball 15a is rotated when the mouse 1 is moved or slid on a desk. Two photo-electric encoders 15-1 and 15-2 are mounted on the printed circuit board 14 and are engaged with the ball 15a for detecting the rotation of the ball 15a to produce X and Y signals, respectively.

The mouse 1 has an additional function control mechanism including the additional switch button 13.

Figure 4:
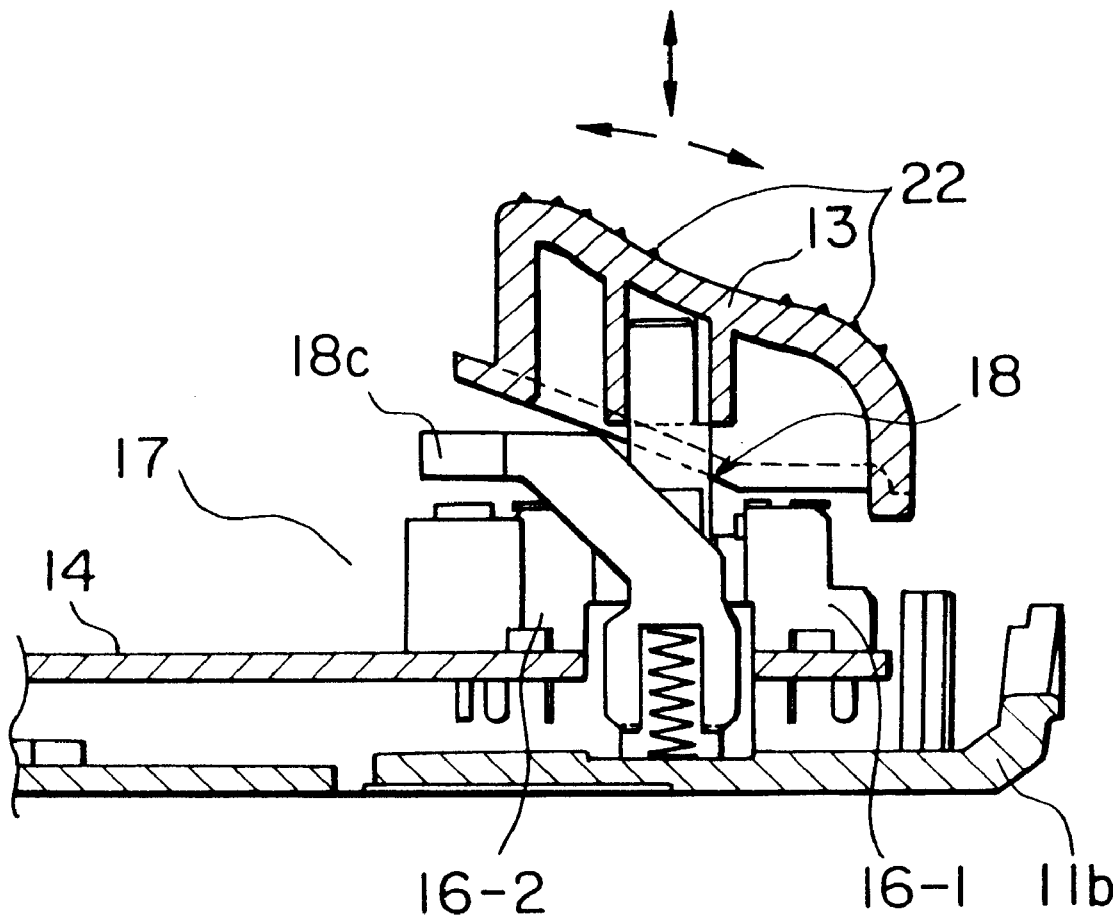
FIG. 4 is a sectional view of a portion of a control switch mechanism of the mouse of FIG. 1.
Figure 5:
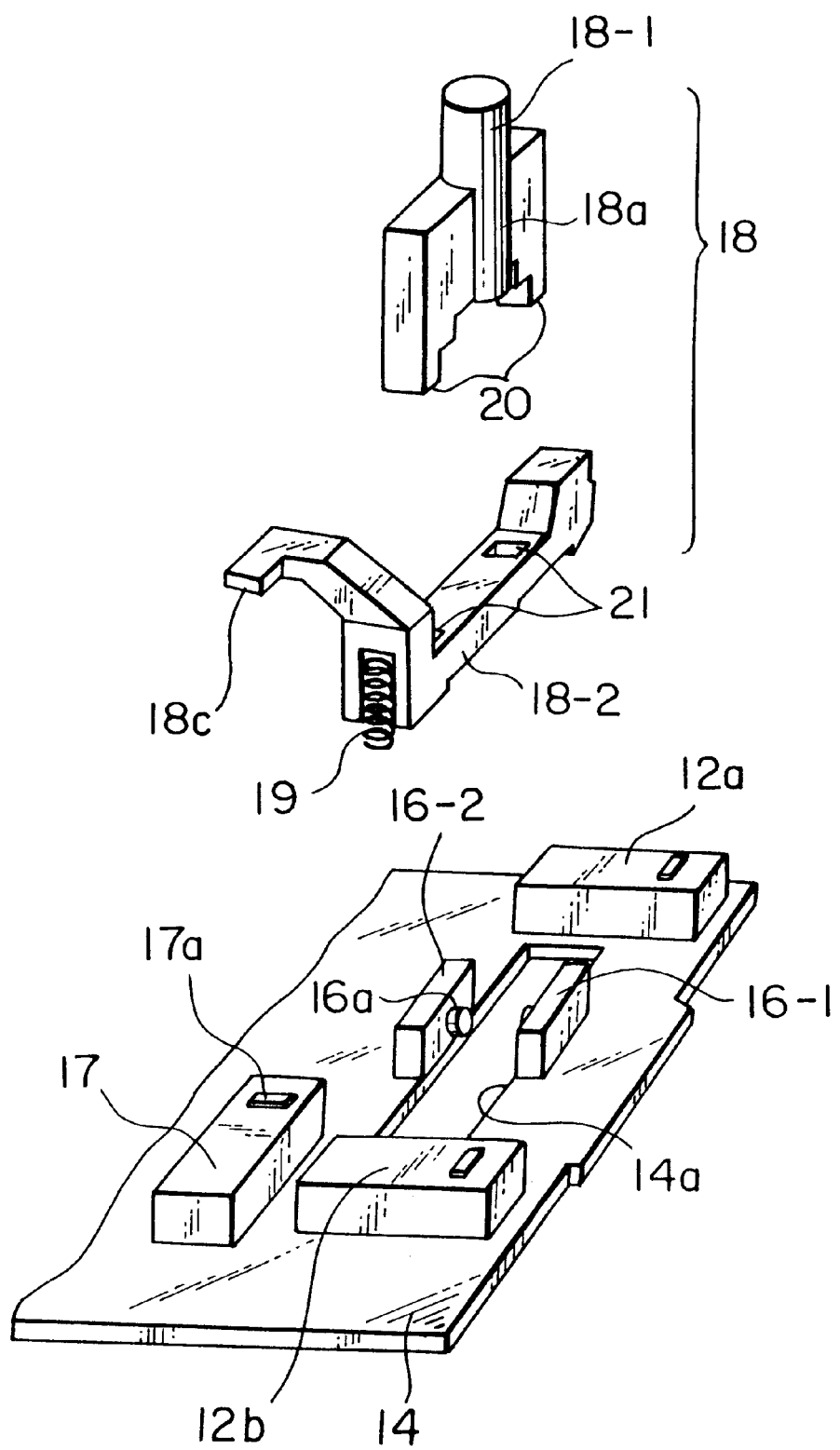
FIG. 5 is a perspective view illustrating the control switch mechanism disassembled.

Referring to FIGS. 4 and 5 in addition to FIG. 3, the additional function control mechanism comprises first and second switches 16-1 and 16-2 that are mounted on the printed circuit board 14 and that face each other with an interspace therebetween, a third switch 17 adjacent to the first and the second switches 16-1 and 16-2 away from the interspace of those first and second switches, and an actuator rod or a switch operating lever 18 for actuating those three switches 16-1, 16-2 and 17.

In the embodiment shown, tact switches are used for the first and the second switches 16-1 and 16-2 and a micro switch is used for the third switch 17. Each of these three switches has an actuator button of insulator (shown at 16*a* and 17*a*) which is elastically projected out of the switch. The actuator button has a movable contact (not shown) within the switch which has also a fixed switch contact. When the actuator button is pushed into the switch against the elastic projecting force by the actuating rod 18, the movable contact is brought into contact with the fixed contact in the switch. When a pushing force by the actuator rod 18 is cancelled, the actuator button is again projected outwardly. In other words, the switch 16-1, 16-2 and 17 can automatically restore to its normal condition when no external force is applied to the actuator button.

The printed circuit board 14 has an opening 14*a* in an area between the first and the second switches 16-1 and 16-2. The actuator rod 18 is elastically supported by coil springs 19 through the opening 14*a* on an inner bottom surface of the lower case 11*b*. Therefore, the actuator rod 18 can be pushed down against the coil springs 19 and can also be inclined from the standing condition. The actuator rod 18 has first and second actuating or operating portions 18*a* and 18*b* which are brought into contact with, and push, the actuator buttons 16*a* of first and second switches 16-1 and 16-2, respectively, when the actuator rod 18 is inclined toward first and second switches 16-1 and 16-2, respectively. The actuator rod 18 is further provided with a third actuating portion 18*c* which pushes down the actuator button 17*a* of the third switch 17 when the actuator rod 18 is pushed down.

Referring to FIG. 5, the actuator rod 18 comprises an upper part 18-1 and a lower part 18-2 both being assembled and combined by fitting keys 20 into key holes 21. Both parts can be molded of plastic resin into given forms by use of individual molds. The lower part 18-2 has holes for receiving the coil springs 19. On the other hand, the upper part 18-1 has a top end on which the additional switch button 13 is attached.

Now, description will be made as to operation of the additional function control mechanism of the mouse in use for controlling scroll operation in the scroll system.

The first and second click switches 12*a* and 12*b* accompanied with click buttons 12-1 and 12-2 and the motion detector 15 are operated and used in a usual manner as known in the art.

When the additional control button 13 is pushed down, the actuator rod 18 goes down against the coil springs 19 to push down the actuator button 17*a* of the third switch 17 by its third actuating portion 18*c*. Thus, the third switch 18 is turned on to produce an electric signal which is used as a scroll mode selection signal.

When the additional control button 13 is pushed forward (in the right direction in FIGS. 1 and 2) to incline the actuator rod 18 toward the first switch 16-1, the actuator button 16*a* thereof is pushed by the first actuating portion 18*a*, so that the first switch 16-1 is turned on to produce a first electric signal during a time when the first switch 16-1 is maintained on. The first electric signal is used as a first scroll signal. That is, the messages displayed on the monitor are up-scrolled at a constant scroll speed until the first scroll signal is stopped. On the contrary, when the additional control button 13 is pushed rearward (in the left direction in FIGS. 1 and 2) to incline the actuator rod 18 toward the second switch 16-2, the actuator button 16*a* thereof is pushed by the second actuating portion 18*a*, so that the second switch 16-2 is turned on to produce a second electric signal during a time when the second switch 16-2 is maintained on. The second electric signal is used as a second scroll signal. That is, the messages displayed on the monitor are down-scrolled at a constant scroll speed until the second scroll signal is stopped.

On the other hand, after selecting the scroll mode by pushing down the additional control button 13 to actuate the third switch 17, the messages displayed on the monitor can continuously be scrolled at a constant speed upward or downward once actuating the first switch 16-1 or the second switch 16-2, respectively. When the additional control button 13 is again pushed down to actuate the third switch 17, the scroll mode is cancelled.

In the scroll mode, the motion detector 15 is also used for providing the scroll signal in the similar manner known in the prior art as described in the preamble.

In the mouse 1 according to an embodiment shown FIGS. 1–5, the additional switch button 13 has a generally elongated rectangular shape in the plan view as shown in FIG. 1 and has a concave top surface where a center portion is depressed comparing with peripheries at both ends in the longitudinal direction as shown in FIGS. 2 and 4.

Figure 6:
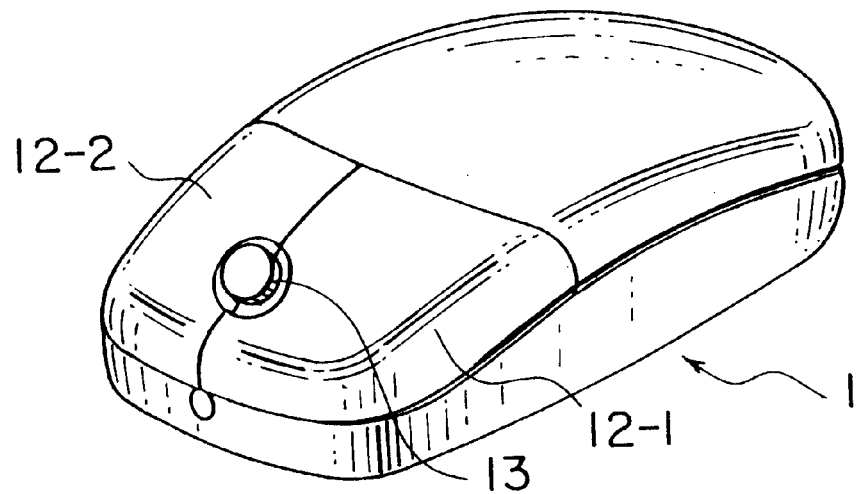
FIG. 6 is a perspective view of a mouse according to another embodiment.
Figure 7:
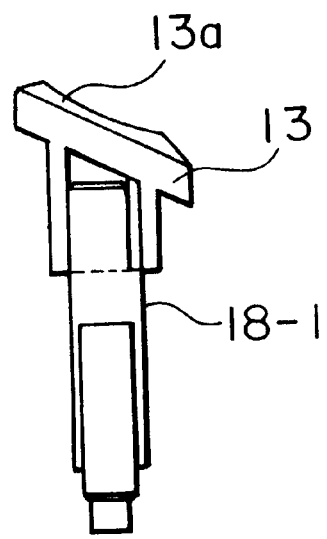
FIG. 7 is a sectional view of an manually operating button with actuator rod used in the mouse of FIG. 6.

Referring to FIGS. 6 and 7, the mouse 1 shown therein is similar to that shown in FIGS. 1–5 except that the additional switch button 13 has a different shape. That is, it has a circular shape with a concave top surface where a center portion is depressed comparing with the circumferential periphery as shown in FIG. 7.

Figure 8:
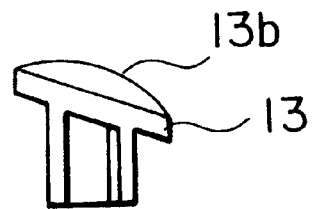
FIG. 8 is a sectional view of another example of the manually operating button.
Figure 9:
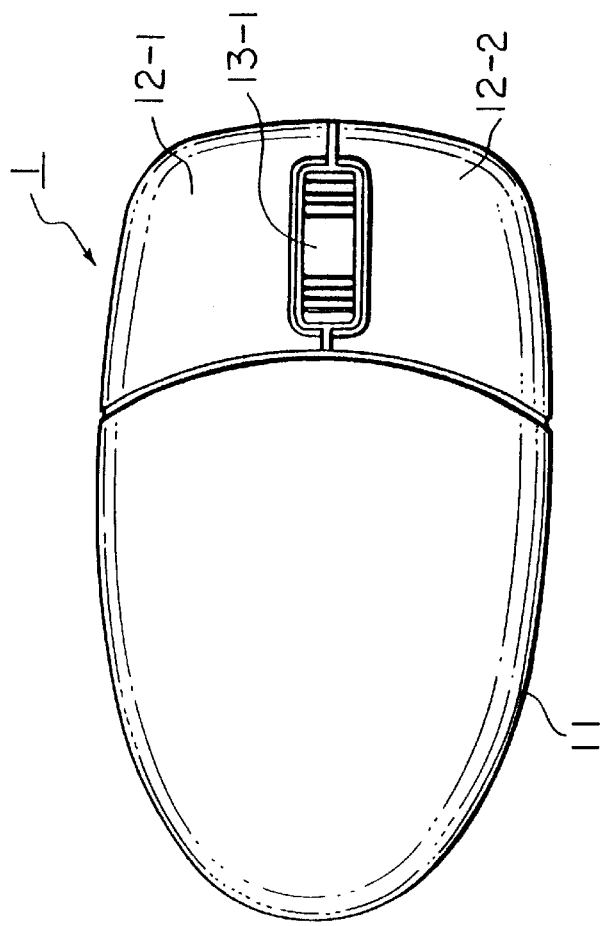
FIG. 9 is a plan view of a mouse according to another embodiment of this invention.
Figure 10:
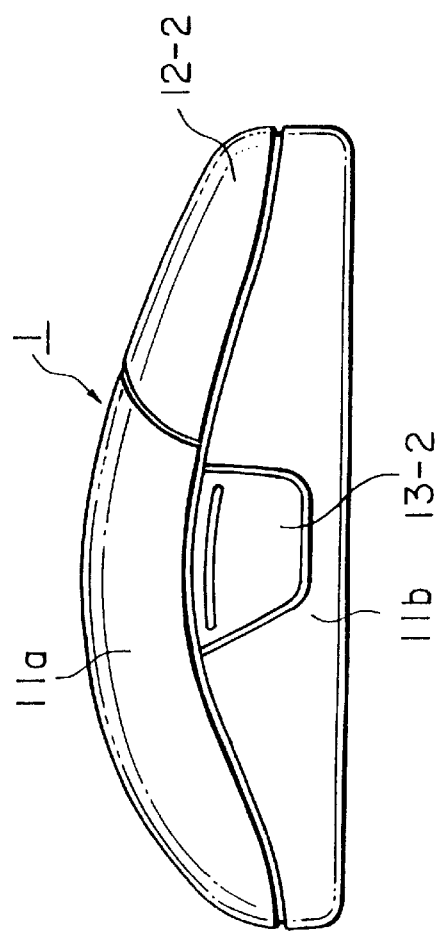
FIG. 10 is a side view of the mouse of FIG. 9.
Figure 11:
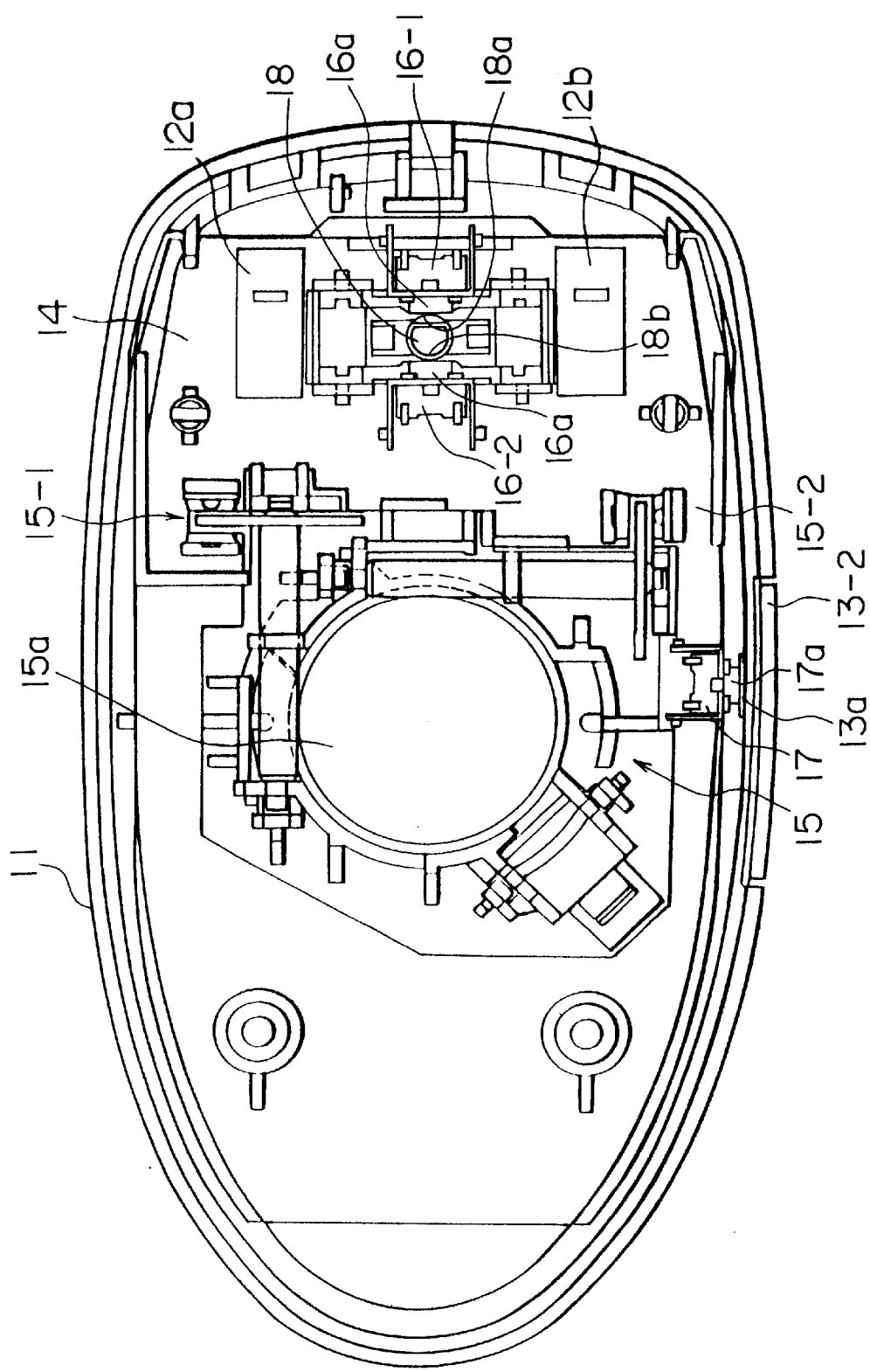
FIG. 11 is a plan view of the mouse of FIG. 9 with an upper case being removed.
Figure 12:
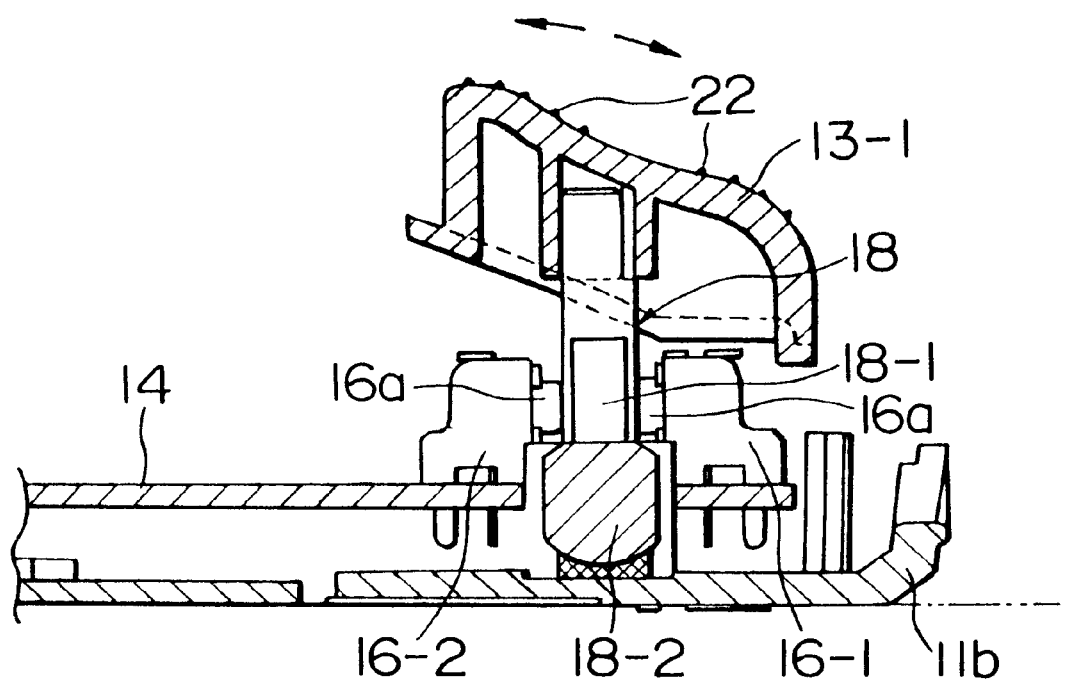
FIG. 12 is a sectional view of a portion of a control switch mechanism of the mouse of FIG. 9.
Figure 13:
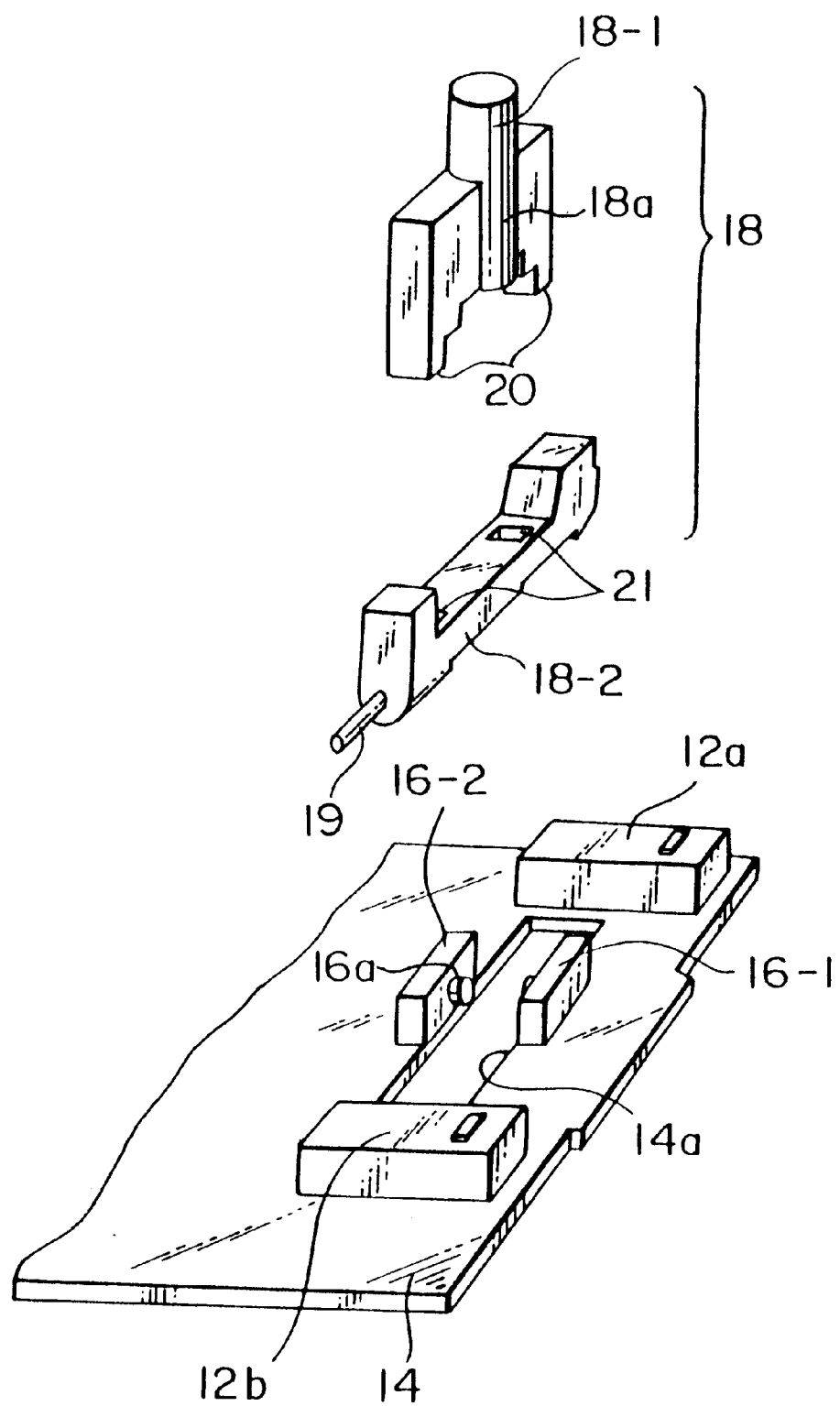
FIG. 13 is a perspective view illustrating the control switch mechanism disassembled.

Referring to FIG. 8, a modified example of the additional switch button 13 shown therein has a convex top surface where a center portion projects comparing with the circumferential periphery.

Referring to FIGS. 9–13, the mouse 1 according to another embodiment shown therein has a similar structure as that shown in FIGS. 1–5 except some differences described below.

The additional switch button 13 in FIG. 1 is also shown as a first button 13-2 and used for operating the first and the second switches 16-1 and 16-2 except the third switch 17. Therefore, the actuator rod 18 does not have the third actuating portion (shown at 18*c* in FIGS. 3–5). Further, the actuator rod 18 is supported on the inner bottom surface of the lower case 11*b* without use of coil springs 19 but the lower end of the actuator rod is slidable for rotation to enable the actuator rod 18 to inline towards the first or the second switch 16-1 or 16-2.

The first switch button 13-1 can have any one of the different shapes as shown in FIGS. 6–9.

The third switch 17 is mounted at a position far away from the first and second switch 16-1 and 16-2 and adjacent to a side wall of the housing 11. Therefore, a side wall button 13-2 is mounted in the side wall of the housing 11, or in the lower case 11*b*. The micro switch 17 sits sideways although upwards in the mouse of FIGS. 1–5.

The other structures are similar to those in the embodiment of FIGS. 1–5. Therefore, they are only shown in the figures but are not described here for the purpose of simplification of the description.

In use of the mouse 1 of FIGS. 9–13, the first switch button 13-1 and the second switch button 13-2 can usually be handled by different fingers, for example, a forefinger and a little finger, respectively.

Figure 16:
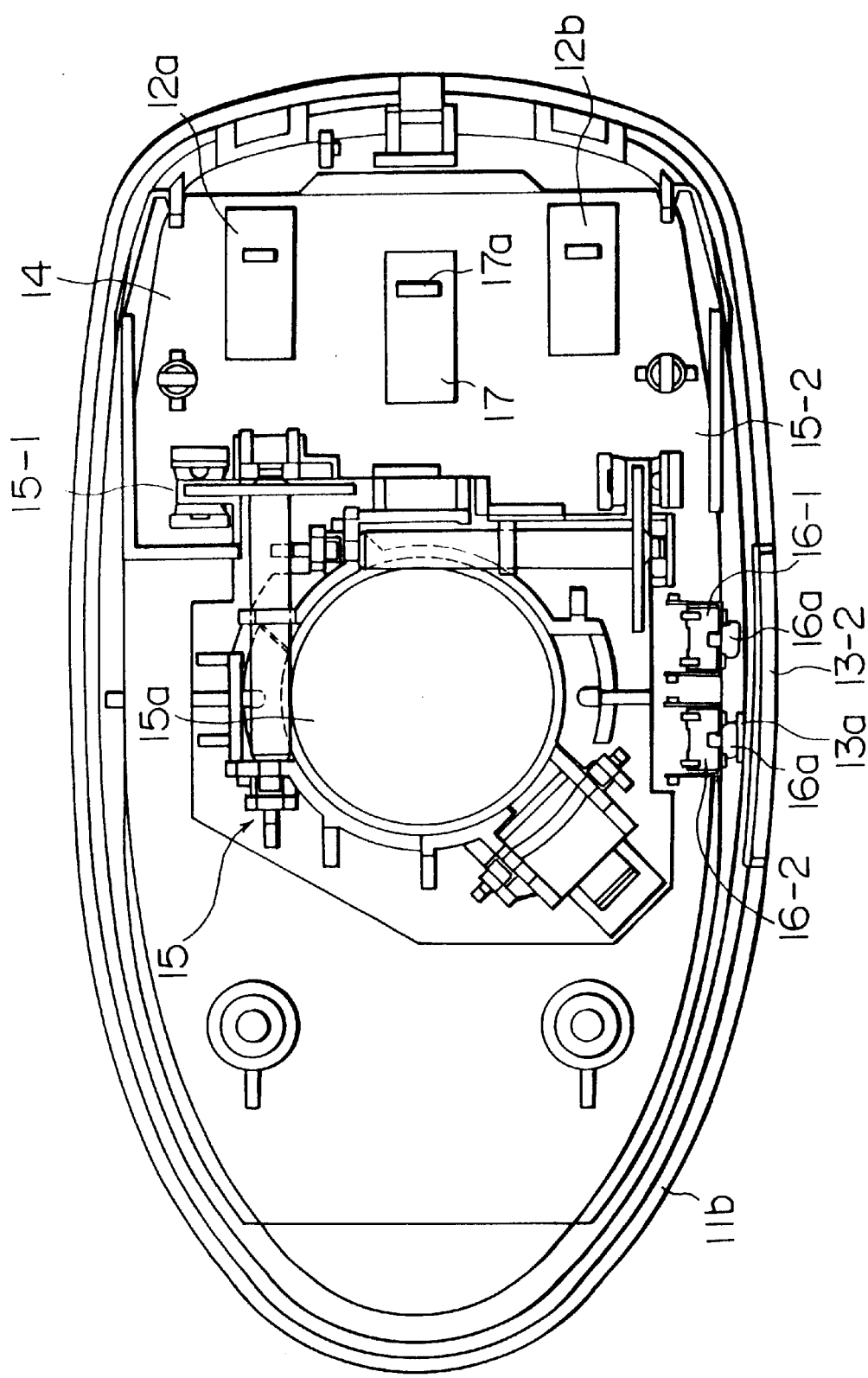
FIG. 16 is a plan view of the mouse of FIG. 14 with an upper case being removed.

Referring to FIGS. 14–16, the mouse 1 shown therein is similar to the mouse of FIGS. 1–5 except that the three switches 16-1, 16-2 and 17 individually have first, second and third switch buttons 13-1, 13-2, 13-3, respectively, while the first and second switches 16-1 and 16-2 being disposed adjacent to a sidewall of the housing 11.

In detail, the first switch 16-1 and the second switch 16-2 are disposed adjacent to an inner surface of the housing 11, specifically, the upper case 11a and the lower case 11b, respectively. The upper case 11a and lower case 11b are provided with the first and the second switch buttons 13-1 and 13-2 for actuating the first and the second switches 16-1 and 16-2, respectively, as shown in FIGS. 15 and 16. Thus, when the first switch button 13-1 is pushed, the actuator button 16a of the first switch 16-1 is pushed by an inner wall of the first switch button 13-1. Therefore, the first switch 16-1 is turned on. Similarly, when the second switch button 13-2 is pushed, the actuator button 16a of the second switch 16-2 is pushed by an inner wall of the second switch button 13-2. Therefore, the second switch 16-2 is turned on.

The third switch button 13-3 is disposed between the two click switch buttons 12-1 and 12-2. This is similar to the button 13 in FIG. 1. The third switch 17 is disposed under the third switch button 13-3 so that the third switch 17 is actuated by the third switch button 13-3 pushed down.

The third switch button 13-3 is shown in an elongated rectangular shape similar to the button 13 in FIG. However, it can have different shape as shown in FIGS. 6–8.

In use of the mouse 1 of FIGS. 14–16, the third switch button 13-3 can be manipulated by the forefinger while the first and the second switch buttons 13-1 and 13-2 can be handled by the little finger.

Figure 17:
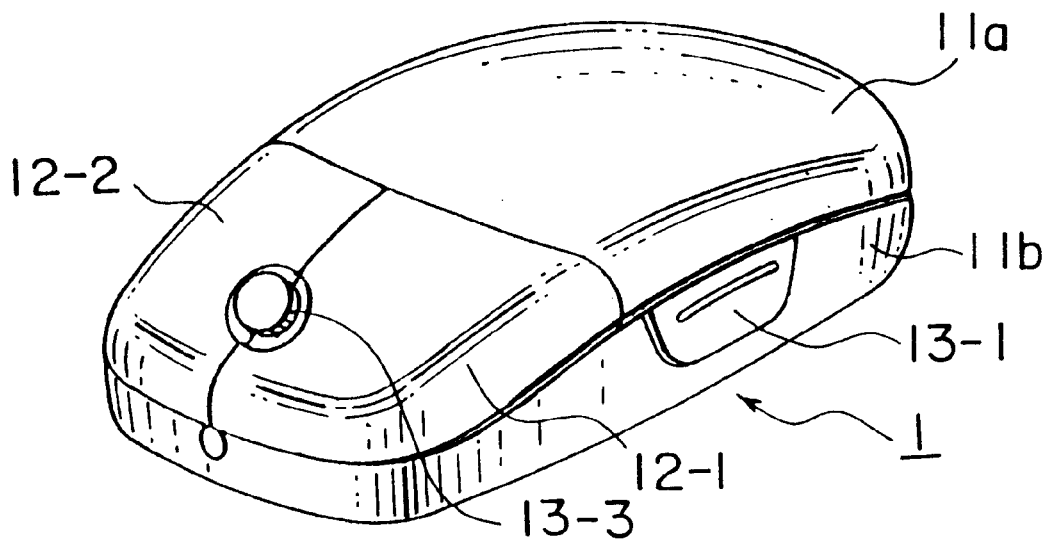
FIG. 17 is a perspective view of a mouse according to another embodiment of this invention.
Figure 18:
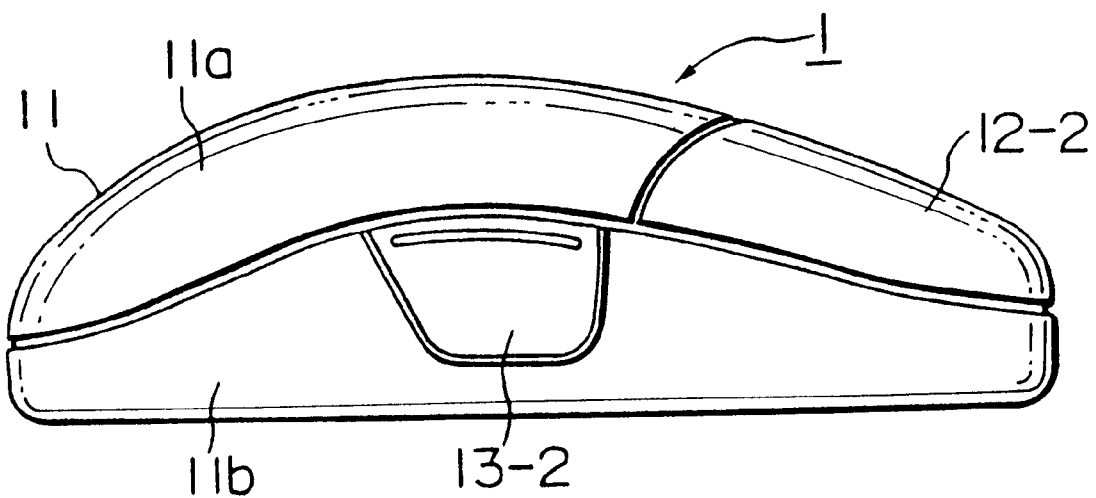
FIG. 18 is an opposite side view of the mouse of FIG. 17.

Referring to FIGS. 17 and 18, the mouse 1 shown therein is a modification of the mouse 1 shown in FIGS. 14–16. In this modification, the first and the second switch buttons 13-1 and 13-2 are mounted in opposite side walls of the lower case 11b. Therefore, it will be easily noted that the first and the second switches 16-1 and 16-2 are also disposed adjacent to the opposite sidewalls of the lower case 11b, although it is not shown for the simplification of the drawing.

The third button 13-3 is shown to have a circular shape but has an elongated rectangular shape as shown in FIG. 14.

In use of the mouse 1 shown in FIGS. 17 and 18, the third switch button 13-3, the first switch button 13-1 and the second switch button 13-2 are handled by the forefinger, the thumb and the little finger, respectively.

What is claimed is:

1. A mouse adapted to be used as an input device for a computer having a monitor that displays a cursor, icons and messages, said mouse comprising:

a housing having an inner bottom surface;

a positional movement detecting mechanism mounted in said housing for detecting movement of said mouse to produce a position signal;

at least one click switch mechanism mounted in said housing and having a click switch button exposed outside of said housing for producing a click signal when said click switch button is operated; and an additional function control mechanism for inputting into said computer, additional instructions for controlling a scroll function of said message displayed on said monitor, wherein said additional function control mechanism comprises:

a first switch element mounted in said housing for producing a first switch signal upon being actuated, said first switch signal representing an instruction for upward scrolling;

a second switch element mounted in said housing for producing a second switch signal upon being actuated, said second switch signal representing an instruction for downward scrolling;

a third switch element mounted in said housing for producing a third switch signal upon being actuated, said third switch signal representing an instruction for identifying an exchange between a scroll mode and a non-scroll mode; and at least one operating button exposed outside of said housing to be manually operated to actuate said first, said second and said third switches independently from each other from outside of said housing.

2. The mouse as claimed in claim 1, wherein:

said first and said second switch elements are disposed to face each other with an interspace therebetween, while said third switch is positioned adjacent to said first and said second switch elements away from said interspace, a switch operating lever is disposed in said interspace and elastically supported on said housing to be thereby possible to be inclined and moved down from a normal standing position, said switch operating lever has a first operating portion to be brought into contact with said first switch element to actuate said first switch element when said switch operating lever is inclined towards said first switch element, a second operating portion to be brought into contact with said second switch element to actuate said second switch element when said switch operating lever is inclined towards said second switch element, and a third operating portion to be brought into contact with said third switch element to actuate said third switch element when said switch operating lever is pushed down, and said at least one operating button is a single and common button which is mounted on a top end of said switch operating lever and having a top surface exposed outside of said housing for manually operating the inclination and downward movement of said switch operating lever.

3. The mouse as claimed in claim 2, wherein said top surface of said operating button has a concave shape with a center area that is depressed as compared with a periphery thereof.

4. The mouse as claimed in claim 3, wherein said operating button has a top surface portion that is elongated in a direction in which said first and said second switch elements are aligned.

5. The mouse as claimed in claim 2, wherein said top surface of said operating button has a convex shape with a center area that outwardly projects as compared with a periphery thereof.

6. The mouse as claimed in claim 2, wherein said at least one click switch mechanism comprises two click switch mechanisms and respective two click switch buttons, said two click switch buttons being disposed adjacent to each other with a button space therebetween, and said operating button being disposed in said button space.

7. The mouse as claimed in claim 6, wherein said housing is generally in an egg shape in a plan view, and said two click switch buttons are disposed at an end portion of said housing having a relatively large curvature of said egg shape and in parallel with a longitudinal direction of said egg shape.

8. The mouse as claimed in claim 1, wherein:

said first and said second switch elements are disposed to face each other with an interspace therebetween, said third switch is positioned adjacent to a side wall of said housing, a switch operating lever is disposed in said interspace and supported on said housing to be possible to be inclined from a normal standing position, said switch operating lever has a first operating portion to be brought into contact with said first switch element to actuate said first switch element when said switch operating lever is inclined towards said first switch element, and a second operating position to be brought into contact with said second switch element to actuate said second switch element when said switch operating lever is inclined towards said second switch element, and said at least one operating button comprises a first button which is mounted on a top end of said switch operating lever and having a top surface exposed outside of said housing for manually operating the inclination of said switch operating lever from the outside of said housing, and a second button mounted on said side wall of said housing to be movable inward to thereby push and actuate said third switch.

9. The mouse as claimed in claim 8, wherein said top surface of said first button has a concave shape with a center area that is depressed as compared with a periphery thereof.

10. The mouse as claimed in claim 9, wherein said first button has a top surface portion that is elongated in a direction in which said first and said second switch elements are aligned.

11. The mouse as claimed in claim 8, wherein said top surface of said first button has a convex shape with a center area that outwardly projects as compared with a periphery thereof.

12. The mouse as claimed in claim 8, wherein said at least one click switch mechanism comprises two click switch mechanisms and respective two click switch buttons, said two click switch buttons being disposed adjacent to each other with a button space therebetween, and said first button being disposed in said button space.

13. The mouse as claimed in claim 12, wherein said housing is generally in an egg shape in a plan view, and said two click switch buttons are disposed at an end portion of said housing having a relatively large curvature of said egg shape and in parallel with a longitudinal direction of said egg shape.

14. The mouse as claimed in claim 1, wherein:

said housing is generally in an egg shape in a plan view, said at least one click switch mechanism comprises two click switch mechanisms and respective two click switch buttons, and said two click switch buttons are disposed in a top face at an end portion of said housing having a relatively large curvature of said egg shape and in parallel with a longitudinal direction of said egg shape, said first and said second switch elements are disposed adjacent to an inner surface of a side wall of said housing, said third switch element is disposed between said two click mechanisms, and said at least one operating button comprises a first button and a second button mounted to be pushed inwardly to actuate said first and said second switch elements, respectively, and a third button disposed in the top face at the end portion of said housing between said two click switch buttons to be pushed inwardly for actuating said third switch element.

15. The mouse as claimed in claim 14, wherein a top surface of said third button has a concave shape with a center area that is depressed as compared with a periphery thereof.

16. The mouse as claimed in claim 15, wherein said third button has a top surface portion that is elongated in the longitudinal direction of said egg shape.

17. The mouse as claimed in claim 14, wherein a top surface of said third button has a convex shape with a center area that outwardly projects as compared with a periphery thereof.

18. The mouse as claimed in claim 14, wherein said first and said second switch elements are disposed adjacent to opposite sidewall portions of said housing, and said first and said second buttons are mounted in said opposite sidewall portions, respectively.

19. The mouse as claimed in claim 14, wherein:

said housing comprises an upper case and a lower case fitted to said upper case, said first button is mounted in a sidewall of said upper case, and said second button is mounted in a sidewall of said lower case.

20. The mouse as claimed in claim 1, wherein said position signal serves as a scroll signal representing a scrolling direction and a scrolling speed during said scroll mode.

* * * * *